Jan. 20, 1959 C. A. CARTER 2,870,220
PRODUCTION OF NONIONIC SURFACE ACTIVE AGENTS
Filed Aug. 11, 1953
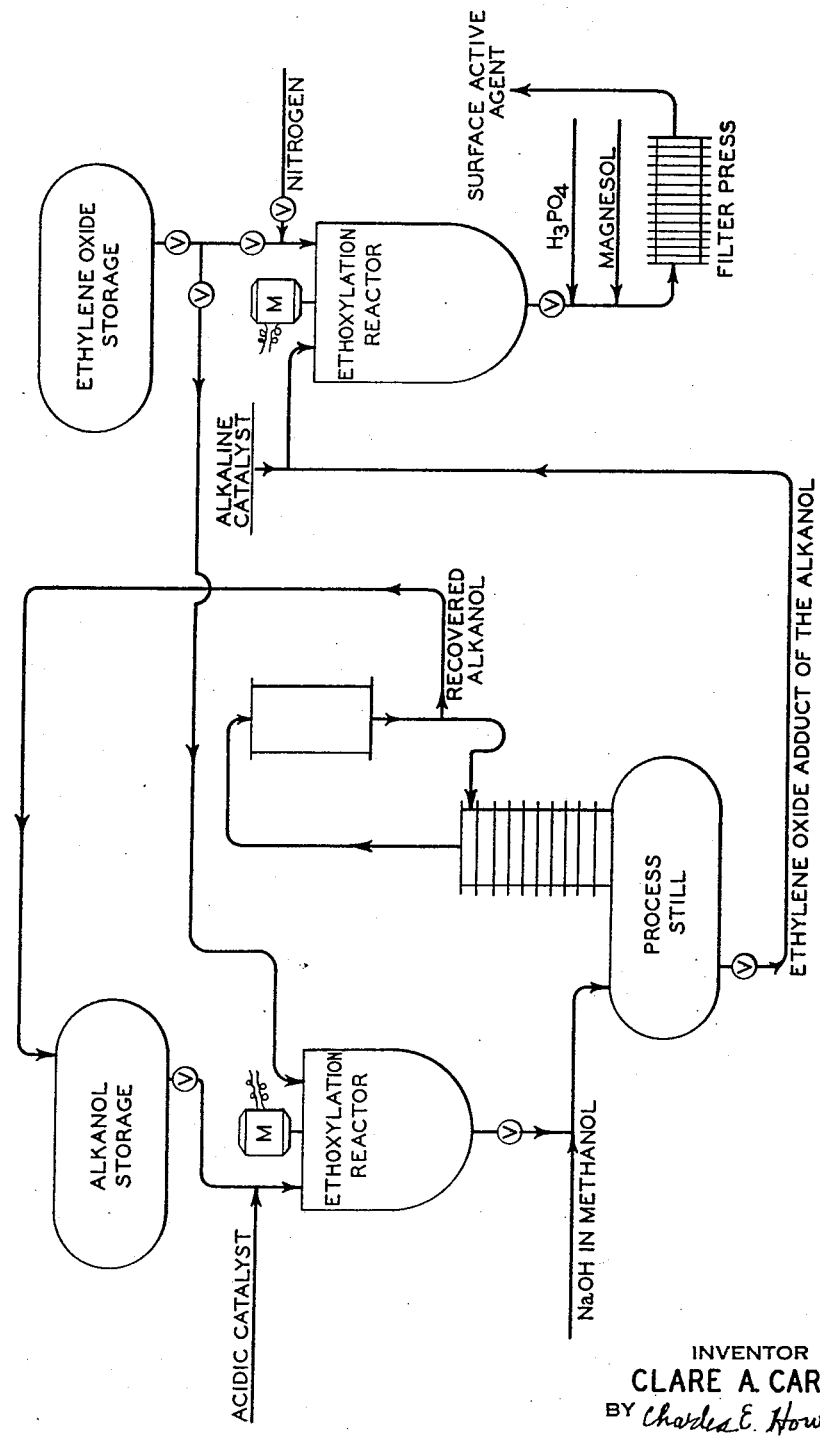
INVENTOR
CLARE A. CARTER
BY Charles E. Howson
ATTORNEY _United States Patent Office_ 2,870,220
Patented Jan. 20, 1959

2,870,220

PRODUCTION OF NONIONIC SURFACE ACTIVE AGENTS

Clare A. Carter, Charleston, W. Va., assignor to Union Carbide Corporation, a corporation of New York Application August 11, 1953, Serial No. 373,670

6 Claims. (Cl. 260—615)

This invention relates to the production of a novel class of polyglycol ethers of higher saturated aliphatic monohydric alcohols having properties adapting such ethers as powerful nonionic wetting agents; and to a novel process for the production of such products. The invention has especial utility for the production, from higher secondary alkanols having 10 to 17 carbon atoms, of polyethylene glycol ethers thereof having up to three-fold the wetting power of compounds heretofore made from such alkanols by known one-step processes by treatment of such alkanols with ethylene oxide in the presence of alkaline catalysts.

Heretofore the polyethylene glycol monoalkyl ethers being made and marketed as wetting agents have not measured up to the alkylphenoxy polyethylene glycols in surface active efficiency. In general such aliphatic polyglycol ethers have been prepared by reacting a higher straight-chain or branched-chain primary or secondary alkanol at elevated temperatures with 6 to 20 mols of ethylene oxide per mol of the alkanol, in the presence of caustic alkalies or alkali alcoholates, at temperatures around 100° C. to 180° C.

While the compounds thus made are effective surface-active agents there has been an increasing demand for the improvement of the wetting efficiencies of compounds of this type.

The invention is based in important part upon the discovery that, under comparable reaction conditions, the rates at which ethylene oxide reacts with the hydroxyl groups of higher molecular weight alcohols having molecular weights around 160 or higher, in the presence of an alkaline catalyst, is of the following approximate order: monoalkyl ethers of polyoxyethylene glycols, 40; primary alkanols, 30; and secondary alkanols, 1. Many of the inevitable higher molecular weight products of the condensation of ethylene oxide with such alcohols (over solvation), in the presence of an alkaline catalyst, as well as the lower molecular weight products (under solvation), are not efficient surface active agents, particularly for wetting power.

The discovery also was made that by the reaction of ethylene oxide with such a higher secondary or primary alkanol, in the presence of an acidic catalyst—e. g.—boron trifluoride, a much larger proportion of the ethylene oxide unites with the initial alkanol, instead of with the monoalkyl glycol ethers initially formed, than is the case in an alkali-catalyzed reaction.

To illustrate, the reaction of equimolar quantities of refined 2,6,8-trimethyl-4-nonanol and ethylene oxide in the presence of an acidic catalyst at 50° C. caused 42% of the alkanol to react with all of the ethylene oxide, yielding a mixture of monotrimethylnonyl ethers of the mono-, di-, tri- and tetraethylene glycols having an average molecular weight of 290. In a similar run, but using a sodium alcoholate catalyst and higher reaction temperatures, only ten per cent of the alkanol reacted with all of the ethylene oxide, demonstrating that the reaction rate of the oxide with the gycol monoalkyl ether products was inordinately rapid, compared to the rate with which the oxide reacted with the initial alkanol. Thus, more than four times as much of the secondary alkanol was converted to the monoalkyl ethers of the ethylene mono- and poly-glycols in the acid-catalyzed process than was secured in the single-stage, alkali-catalyzed reaction commonly used heretofore. The mixture of monoalkyl ethers of the aforesaid glycols made in the present process has a much narrower molecular weight range than is secured when using an alkaline catalyst.

According to the present invention, secondary and primary alkanols having 10 to 17 carbon atoms can be readily converted with good yields into corresponding monoalkyl ethers of ethylene glycol and polyethylene glycols of a more restricted molecular weight range, which products are highly efficient surface active agents, by a novel two-stage process. In the first stage thereof the alkanol and ethylene oxide are reacted in the presence of an acidic catalyst under conditions favoring the initial reaction of ethylene oxide with the alkanol, and minimizing the reaction of ethylene oxide with the mono- and polyethylene glycol ethers as the latter are formed. This mixture, after removal of the acidic catalyst and any unreacted alkanol, is reacted with ethylene oxide in the presence of an alkali metal alcoholate of the initial alkanol, or preferably of the corresponding alcoholate of the monoalkyl ether of a mono- or polyethylene glycol made in the first stage of the process. These catalysts can be made in situ by reacting the stripped product of the first reaction stage with an alkali metal, alkali metal oxide or hydroxide, as hereinafter described.

Among the more important objects of the invention are: the production in novel manner of highly efficient wetting agents from higher secondary and primary branched-chain and straight-chain alkanols having 10 to 17 carbon atoms and preferably having the hydroxyl group attached at or near the middle of the carbon chain, by reaction thereof with ethylene oxide; and the production in novel manner of nonionic surface active agents of high wetting power comprising mixtures of monoalkyl ethers of polyethylene glycols substantially free from primary and/or secondary alkanols as well as free from monoalkyl ethers of ethylene glycol.

In accordance with the preferred form of the invention ethylene oxide is reacted in a first reaction stage with a branched-chain or straight-chain higher secondary alkanol, and preferably one having the hydroxyl group attached to a carbon atom at or near the middle of the carbon chain, in the presence of an acidic catalyst. The acidic catalyst used in this first stage of the process conveniently can be one of the well known class of the Friedel-Crafts type reaction catalysts, such as the fluorides and chlorides of boron, aluminum, iron, tin and titanium, and complexes of such halides with ethyl ether. Sulfuric acid and phosphoric acid also are effective.

Preferably the ethylene oxide is slowly added during several hours to an agitated body of the secondary alkanol having from 0.02% to 0.05% or more of its weight of the acidic catalyst present therein, within a fluid-tight reactor, while maintaining the reaction mixture at a temperature within the range from 0° C. to 80° C., and preferably at about 50° C., and at pressures from around atmospheric to 50 p. s. i. gauge. This reaction is continued until all of the ethylene oxide added has reacted with the alkanol. A stream of the ethylene oxide is passed into the alkanol and reacted therewith in a molar ratio within the range from 0.2:1 to 4:1; and preferably from 0.8:1 to 1.5:1. A molar ratio of 1:1 gives excellent results.

The reaction mixture then is neutralized, commonly with a 10% methanolic caustic soda solution. The neutralized reaction mixture is fractionally distilled under vacuum, and the unreacted secondary alkanol is separately recovered.

The distillation residue is a mixture of monoalkyl ethers of ethylene glycol and the lower polyethylene glycols, commonly having average molecular weights in the range from 200 to 400.

This residue of monoalkyl ethers of ethylene glycol and the polyethylene glycols has mixed therewith between about 0.5 and about 75 mol percent thereof, and preferably about 4 mol percent, of an alkali metal alcoholate of a monoalkyl ether of one of the said glycols, preferably of an ether corresponding to one present in the said residue from the first-stage reaction.

The alcoholate can be made in situ by reacting the said residue with a powdered caustic alkali, or with an alkali metal or an alkali metal alcoholate of a low molecular weight alkanol such as methanol, while heating the mixture to elevated temperatures in the range from 80° C. to around 200° C. The reaction desirably is conducted in an atmosphere of nitrogen, with the water or low molecular weight alkanol product of reaction being removed as formed, until substantially all of the caustic alkali, alkali metal or the equivalent has reacted with the glycol mono ether.

Then, ethylene oxide slowly is added to the agitated body of the monoalkyl ethers of ethylene glycol and of the di-, tri-, and higher polyethylene glycols while maintaining the temperature within the range from 80° C. to 200° C., and preferably about 125° C., until a 0.5 weight percent aqueous solution of the resultant product has a cloud point within the range from 10° C. to 100° C. As more ethylene oxide reacts the product becomes more soluble in water, and the cloud point rises concurrently. The cloud point is that temperature at which the product precipitates from 0.5% aqueous solution thereof due to a characteristic property of inverse solubility. These final surface active products correspond to total ethylene oxide to reacted alkanol molar ratios within the range from 4:1 to 20:1.

The accompanying drawing is a flow diagram illustrating the arrangement of the process steps of the invention.

While for convenience the invention will be illustrated herein principally in connection with the use of the branched-chain secondary alkanols having 10 to 17 carbon atoms, such as 2,6,8-trimethyl-4-nonanol, it will be understood that other branched-chain and straight-chain secondary alkanols can be used effectively in the process. Also primary alkanols having 10 to 17 carbon atoms are suitable for use; but the process offers somewhat fewer advantages over known methods in the case of the primary alkanols.

Among alkanols found useful in the process are the following: 2 - methyl - 7 - ethyl - 4 - nonanol; 2,7 - dimethyl-4-decanol; 2-butyloctanol; 2,6,8-trimethyl-4-nonanol; 1-dodecanol; 3,3-dineopentyl-1-propanol; tridecanol-1; 3-ethyl-6-undecanol; 2-methyl-7-ethyl-4-undecanol; 3,9-diethyl-6-undecanol; 3,9-diethyl-6-tridecanol.

The following examples will serve to illustrate the invention:

EXAMPLE I

Fifty mols of 2,6,8-trimethyl-4-nonanol of 97% purity, containing 0.05% by weight of boron trifluoride were charged to an autoclave having agitating means. The charge was heated to 50° C., the autoclave purged with nitrogen, and 50 mols of ethylene oxide were fed to the agitated mixture at a rate maintaining a pressure of 0 to 3 p. s. i., gauge, while preventing the temperature from rising above 55° C. during the ethylene oxide feed period for four hours and for two hours longer until all of the ethylene oxide had reacted.

The crude reaction mixture then was neutralized with a 10% solution of caustic soda in methanol until the mixture barely turned phenolphthalein pink. The neutralized mixture was fractionally distilled under vacuum, removing overhead and separately recovering (1) methanol, (2) unreacted starting alcohol, and (3) reaction products boiling up to approximately the boiling point of mono-2,6,8-trimethyl-4-nonyl ether of ethylene glycol, e. g., 171° C. at a pressure of 50 mm. of mercury. The kettle residue was 20.5 mols of a mixture of monotrimethylnonyl ethers of mono-, and lower molecular weight polyethylene glycols having an average molecular weight of 290, and containing an average of 2.36 mols of combined ethylene oxide per mol of said mixture.

Four mols (1160 grams) of this kettle residue of glycol ethers were charged into an autoclave having agitating means, and 13 grams of powdered caustic soda that had been slurried with a portion of this charge were added and the charge heated to 165° C., while slowly purging the autoclave with nitrogen free from oxygen and acidic gases such as $CO_2$.

When the temperature of the mixture reached 165° C., the pressure on the autoclave was raised to 5 p. s. i., gauge, by means of nitrogen. Then during 5 hours approximately 24 mols of ethylene oxide vapors were fed at a uniform rate to the vapor space above the liquid in the autoclave. The pressure reached a maximum of 8 p. s. i., gauge. The crude product was sampled frequently, and the ethylene oxide feed was discontinued when the cloud point of a 0.5% by weight aqueous solution thereof was 35° C. The average molecular weight of the products thus made was 545.

The crude autoclave product was converted with phosphoric acid to a pH of 8.5, and then was treated for five hours at 100° C. with 0.5% by weight of a hydrous magnesium silicate, and then was filtered. The filtrate consisted of a viscous, light yellow, mild-odored fluid which was homogeneous at temperatures above 50° C. At room temperature waxy high molecular weight components tended to crystallize out. The product could be stabilized against segregation and crystallization of waxes at temperatures as low as 10° C. by the addition of 5 to 10 percent by weight of water.

EXAMPLE II 6 mols of 2-methyl-7-ethyl-4-undecanol containing 0.05 percent by weight of boron trifluoride was charged to a container having agitating means, and the mixture cooled to 10° C. Six mols of ethylene oxide then were added rapidly to the alcohol, and the mixture allowed to heat to 50° C. at atmospheric pressure during a period of two hours. Thereafter the temperature was maintained at 50° C. until all of the ethylene oxide had reacted.

The reaction mixture was neutralized with a solution of caustic soda in methanol until the mixture barely turned phenolphthalein pink. The neutralized mixture was fractionally distilled under reduced pressure, removing overhead and separately recovering (1) methanol, (2) unreacted starting alcohol, and (3) reaction products boiling up to approximately the boiling point of the mono-(2-methyl-7-ethyl-4-undecyl) ether of ethylene glycol (e. g., 158° C. at a pressure of 10 mm. of mercury). The kettle residue consisted of 2.6 mols of a mixture of monotetradecyl ethers of ethylene glycol and polyethylene glycols having an average molecular weight of 315 and containing an average of 2.3 mols of combined ethylene oxide per mol of the mixed ethers.

One mol (315 grams) of this kettle residue and 1 gram of metallic sodium were placed in an autoclave and heated to 165° C., with agitation, while purging the autoclave with nitrogen free from oxygen and acidic gases. Then, while holding the mixture at 165° C., approximately 7.4 mols of ethylene oxide vapors were fed at a uniform rate under atmospheric pressure to the vapor space above the liquid in the autoclave. The ethylene oxide feed was discontinued when the cloud point of 0.5 percent by weight aqueous solution of the mixture was 35° C.

The alkaline catalyst was neutralized with phosphoric acid until the mixture had a pH within the range from 7 to 9. The mixture then was filtered to remove inorganic salts. The filtrate, a light yellow, viscous liquid, was readily stabilized against segregation at temperatures down to 10° C. by the addition of 10 percent of its weight of water.

EXAMPLE III

Four mols of 2-butyl-1-octanol containing 0.05 percent by weight of boron trifluoride were charged to a flask and cooled to 10° C. Then 4 mols of ethylene oxide were added rapidly to the alkanol with agitation, in the manner described in Example 2, the reaction being conducted at 50° C. and the reaction mixture then neutralized with a methanolic solution of caustic soda. The neutralized reaction mixture then was fractionally distilled to remove methanol and unreacted butyloctanol, leaving a kettle residue which consisted of 2.26 mols of a mixture of mono-(2-butyl-1-octyl) ethers of ethylene glycol and polyethylene glycols having an average molecular weight of 264, and containing an average of 1.77 mols of combined ethylene oxide per mol of the said mixture of mono ethers.

One mol (264 grams) of this kettle residue and 1 gram of metallic sodium were charged to a flask having agitating means, and the mixture was heated to 165° C. while purging the flask with nitrogen free from oxygen and carbon dioxide. Then, while holding the mixture at 165° C. approximately 6.5 mols of ethylene oxide were fed at a uniform rate and atmospheric pressure to the vapor space above the liquid level in the flask. The ethylene oxide feed was discontinued when the cloud point of a 0.5 percent by weight aqueous solution of the mixture was 50° C.

After neutralization of the reaction mixture with phosphoric acid in the manner described in Example 2, and filtration of the neutralized mixture to eliminate inorganic salts, the residual nonionic surfactant was a clear, light yellow, viscous liquid.

The following table presents data of the comparative wetting efficiencies of nonionic surface active agents made by the process of the present invention and products made from the same starting secondary alcohols by certain single-stage reactions with ethylene oxide:

Table 1

| Alkanol Source of Hydrophobe | Mol ratio, ethylene oxide: alkanol | Avg. Mol. Wt of glycol mono-ether product | Catalyst | Wetting Efficiency of Product [1] |
|---|---|---|---|---|
| 2,6,8-trimethyl-4-nonanol | 8.3 | 550 | A | 0.23 |
| Do | 8.5 | 560 | [2] NaOR | 0.70 |
| Do | 10.5 | 650 | [2] BF₃ | 0.60 |
| 2-methyl-7-ethyl-4-undecanol | 9.7 | 640 | A | 0.25 |
| Do | 11.5 | 720 | [2] NaOR | 0.65 |
| Do | 12.2 | 750 | [2] BF₃ | 0.55 |
| 5-ethyl-2-nonanol | 8.3 | 505 | A | 0.26 |
| 6-dodecanol | 8.5 | 560 | A | 0.23 |
| 3-ethyl-6-undecanol | 9.1 | 600 | A | 0.23 |
| 3,9-diethyl-6-undecanol | 11.4 | 730 | A | 0.29 |
| 3,9-diethyl-6-tridecanol | 12.8 | 820 | A | 0.42 |

[1] Wetting efficiency=grams of surfactant per liter of water at 25° C. necessary for 20-seconds wetting time by Draves method, described in the Year Book of American Association of Textile Chemists and Colorists (1943), vol. XX page 226.
[2] For comparison. Single stage reactions.

In Tables 1 and 2, catalyst "A" indicates a two-stage reaction of this invention, in the first stage of which boron trifluoride was used as catalyst, and in the second stage of which the sodium alcoholate derivative of the starting alkanol or of the corresponding monoalkyl ether of an ethylene glycol was used.

The process of this invention also is useful for the production from primary straight-chain and branched-chain alkanols having 10 to 17 carbon atoms, of poly- ethylene glycol mono ethers thereof of high wetting power, as illustrated in Table 2.

Table 2

| Alkanol Source of Hydrophobe | Mol ratio, ethylene oxide: alkanol | Avg. Mol. Wt. of glycol mono-ether product | Catalyst | Wetting Efficiency of Product [1] |
|---|---|---|---|---|
| 1-decanol | 5.3 | 390 | A | 0.26 |
| 2-butyl-1-octanol | 7.9 | 535 | A | 0.20 |
| 3,3-dineopentyl-1-propanol | 7.7 | 540 | A | 0.18 |
| tridecanol-1 | 8.0 | 550 | A | 0.21 |
| Do | 8.2 | 560 | [2] NaOR | 0.24 |

[1] The wetting efficiency=grams of surfactant per liter of water at 25° C. required for 20-seconds wetting time, using the aforesaid Draves method.
[2] For comparison. A single stage process using as catalyst the sodium salt of the indicated alkanol.

Excepting where otherwise indicated, the monoalkyl ethers of the polyethylene glycols were made by the two-stage process of this invention, using boron trifluoride as catalyst in the first stage, and using the sodium alcoholates of the glycol ether products of the first stage as the catalyst in the second stage.

By the practice of this invention nonionic surface active agents are produced possessing 1.5 to 3 times the wetting power and efficiency for related surface active phenomena possessed by similar secondary alkanol ethers of mono- and polyoxyethylene glycols made by the reaction of ethylene oxide and the secondary alkanol by a single-stage process, using either an acidic catalyst or an alkaline catalyst.

The invention is susceptible of modification within the scope of the appended claims.

I claim:

1. The process which comprises in a first stage passing ethylene oxide into a secondary alkanol having 10 to 17 carbon atoms, held at a temperature within the range from 0° C. to 80° C. in the presence of an acidic catalyst of the class consisting of the Friedel-Crafts type catalysts, sulfuric acid and phosphoric acid, until between 0.2 mol. and 4 mols of the ethylene oxide have reacted per mol of the alcohol, neutralizing the resultant reaction mixture, removing unreacted alkanol, and in a second stage reacting the residual mixture of monoalkyl ethers of the mono- and polyethylene glycols with ethylene oxide in the presence of an alkali metal alcoholate of a monoalkyl ether of at least one polyethylene glycol until a total of between 4 and 20 mols of ethylene oxide have reacted per mol of the alkanol reacted in the first stage.

2. The process which comprises in a first stage passing ethylene oxide into a secondary alkanol having 10 to 17 carbon atoms, held at a temperature within the range from 0° C. to around 80° C., in the presence of an acidic catalyst of the class consisting of the Friedel-Crafts type catalysts, sulfuric acid and phosphoric acid, until between 0.2 mol and 4 mols of the ethylene oxide have reacted per mol of the secondary alkanol, neutralizing the resultant reaction mixture, removing unreacted alkanol, and in a second stage reacting the residual mixture of monoalkyl ethers of the mono- and polyethylene glycols with ethylene oxide at temperatures within the range between around 80° C. and around 200° C. in the presence as catalyst of an alkali metal alcoholate of a monoalkyl ether of at least one polyethylene glycol until a total of between 4 and 20 mols of ethylene oxide have reacted per mol of the alkanol reacted in the first stage.

3. The process which comprises passing ethylene oxide into a secondary alkanol having 10 to 17 carbon atoms, held at a temperature within the range from 0° C. to 80° in the presence of an acidic catalyst of the class consisting of the Friedel-Crafts type catalysts, sulfuric acid and phosphoric acid, until between 0.2 mol and 4 mols of the ethylene oxide have reacted per mol of the secondary alkanol, neutralizing the resultant reaction mixture, removing unreacted alkanol, and reacting the residual mixture of monoalkyl ethers of the mono- and polyethylene glycols with ethylene oxide in the presence of an alkali metal alcoholate of at least one of the aforesaid glycol ethers until a 0.5% aqueous solution of the crude reaction product has a cloud point within the range from 10° C. to 100° C.

4. The process which comprises passing ethylene oxide into a secondary alkanol having 10 to 17 carbon atoms, held at a temperature within the range from 0° C. to 80° C. in the presence of an acidic catalyst of the class consisting of the Friedel-Crafts type catalysts, sulfuric acid and phosphoric acid, until between 0.2 mol and 4 mols of ethylene oxide have reacted per mol of the secondary alkanol, neutralizing the resultant reaction mixture, removing unreacted alkanol, and reacting the residual mixture of monoalkyl ethers of the mono- and polyethylene glycols with ethylene oxide at temperatures within the range between 80° C. to 200° C. in the presence of an alkali metal alcoholate of a monoalkyl ether of at least one polyethylene glycol until an 0.5% aqueous solution of the crude reaction product has a cloud point within the range from 10° C. to 100° C.

5. The process as defined in claim 3, together with the step of reducing the pH of the crude final reaction product to about 8.5, treating the product at temperatures around 100° C. with a small amount of a hydrous magnesium silicate, and eliminating the solids from the thus treated reaction product.

6. The process which comprises in a first stage passing ethylene oxide into a secondary alkanol having 10 to 17 carbon atoms, held at a temperature within the range from 0° C. to 80° C. in the presence of an acidic catalyst of the class consisting of the Friedel-Crafts type catalysts, sulfuric acid and phosphoric acid, until between 0.2 mol and 4 mols of the ethylene oxide have reacted per mol of the alcohol, neutralizing the resultant reaction mixture, removing unreacted alkanol, and in a second stage reacting the residual mixture of monoalkyl ethers of the mono- and polyethylene glycols with ethylene oxide in the presence of an alkali metal alcoholate of a monoalkyl ether of at least one polyethylene glycol formed in situ in said residual mixture of monoalkyl ethers of the mono- and polyethylene glycols until a total of between 4 and 20 mols of ethlene oxide have reacted per mol of the alkanol reacted in the first stage.

References Cited in the file of this patent

UNITED STATES PATENTS

| | | |
|---|---|---|
| 2,131,142 | Orthner | Sept. 27, 1938 |
| 2,133,480 | Schoeller et al. | Oct. 18, 1938 |
| 2,355,823 | Schlegel | Aug. 15, 1944 |
| 2,425,755 | Roberts et al. | Aug. 19, 1947 |
| 2,481,278 | Ballard et al. | Sept. 6, 1949 |
| 2,508,035 | Kosmin | May 16, 1950 |
| 2,508,036 | Kosmin | May 16, 1950 |
| 2,617,830 | Kosmin | Nov. 11, 1952 |
| 2,637,740 | Kosmin | May 5, 1953 |
| 2,671,115 | Kosmin | Mar. 2, 1954 |
| 2,671,116 | Kosmin | Mar. 2, 1954 |